No. 707,787. Patented Aug. 26, 1902.
W. F. MARRESFORD.
MACHINE FOR AFFIXING LABELS.
(Application filed July 2, 1901.)
(No Model.) 9 Sheets—Sheet 7.

No. 707,787. Patented Aug. 26, 1902.
W. F. MARRESFORD.
MACHINE FOR AFFIXING LABELS.
(Application filed July 2, 1901.)
(No Model.) 9 Sheets—Sheet 9.

UNITED STATES PATENT OFFICE.

WILLIAM F. MARRESFORD, OF NEW YORK, N. Y.

MACHINE FOR AFFIXING LABELS.

SPECIFICATION forming part of Letters Patent No. 707,787, dated August 26, 1902.

Application filed July 2, 1901. Serial No. 66,825. (No model.)

*To all whom it may concern:*

Be it known that I, WILLIAM F. MARRESFORD, a citizen of the United States, residing at New York city, in the county of Kings and State of New York, have invented certain new and useful Improvements in Machines for Preparing Dress-Patterns for the Market, of which the following is a full, clear, and exact specification.

This invention relates to machines for preparing paper patterns and the like for the market; and its object is to provide a machine for automatically performing the various essential operations to prepare the pattern for the market after it has been folded.

Paper dress-patterns when prepared for the market, after having been folded rectangularly, are numbered, the folds secured together, ordinarily by passing a suitable binder through the folds of the pattern, and a label or printed directions then affixed to the pattern. These various operations have heretofore been performed by hand. I propose to provide a machine which shall be adapted to perform all of these operations or any of them in any desired sequence.

In the accompanying drawings I have illustrated one form which the invention may take in practice. In this form the folded patterns and the labels are placed in suitable feed-hoppers and fed together, the pattern being numbered and the label having paste applied thereto while being fed together. The label is then pressed upon the pattern and the folds of the patterns, and preferably the label also, secured together by the staple. The order in which these operations are performed and the form of mechanism for effecting the various operations may be varied indefinitely.

The invention will be more particularly described with reference to the form shown in the accompanying drawings, in which—

Fig. 12$^a$ represents detail top and sectional views showing the position of the securing-clip with relation to the folds of the patterns.

Referring more particularly to the drawings, 1 and 2 respectively represent the side frames of the machine, these being held together by suitable tie-rods, such as 3 4.

5 represents the main driving-shaft carrying the pulley 6, to which power is applied, and preferably the hand-wheel 7 is also provided.

Figure 5:
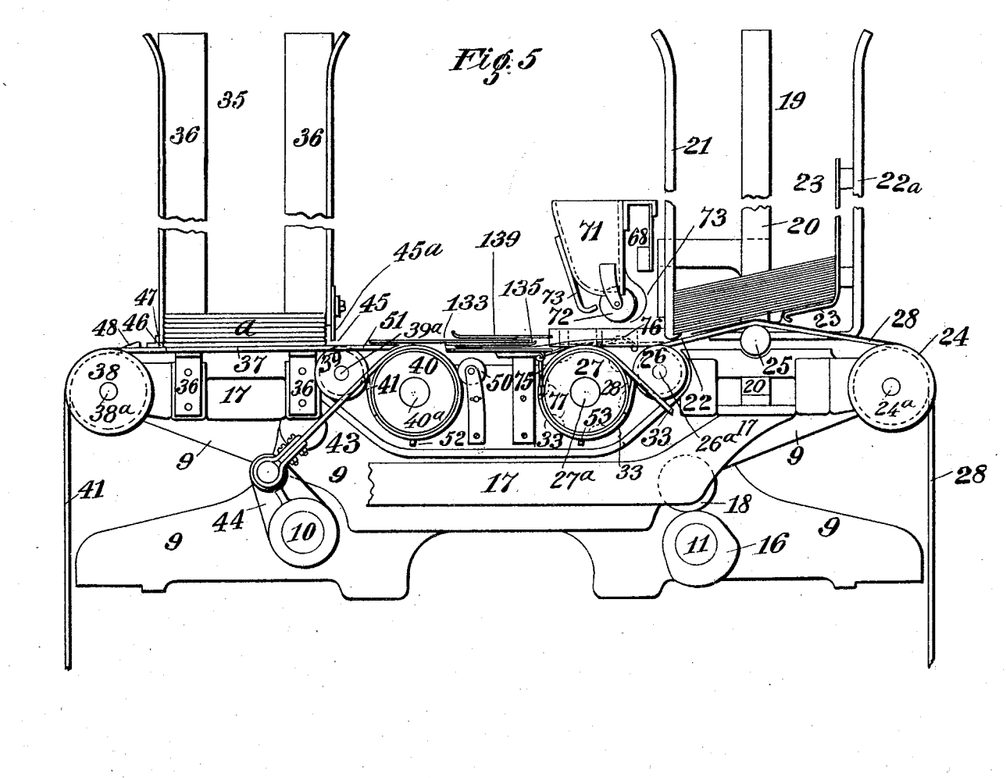
Fig. 5 is an enlarged detail view showing the feeding and pasting mechanism.

Suitably journaled in the cross-frames 8 and 9, which also join the side frames 1 and 2 and are themselves joined by the bridge-piece 9$^a$, are the right and left hand main shafts 10 and 11. Shaft 10 carries a bevel gear-wheel 12, which meshes with a pinion 13 upon the driving-shaft, and shaft 11 carries a bevel gear-wheel 14, which meshes with a pinion 15, also carried on shaft 5. Upon shafts 10 and 11 are mounted the various cams for operating the stapling mechanism, as will be hereinafter described. These shafts also respectively carry the cams 16 16. Only one of these cams 16 is shown in Fig. 5; but the construction with respect to shaft 10 is precisely the same.

The frame 17, which because it carries a portion of the label-separating mechanism I will hereinafter refer to as the "separator-frame," is independent of the frame of the machine, but is arranged substantially parallel to the cross-frame 9 and also arranged to move vertically and parallel to the cross-frame. Rollers 18 are carried by the separator-frame 17 and are adapted to engage the cams 16 in order that when the cams 16 are rotated together the frame 17 will be evenly raised and lowered.

The hopper 19 for holding the pile of labels comprises a frame supported by the uprights 20 upon the separator-frame 17, the hopper-frame consisting of the parallel strips or bars 20, 21, and 22ª, the bar 22ª supporting a shelf 23 at its lower end, the shelf extending substantially the width of the hopper. The bars 21 have each a supporting-shelf 22, the arrangement being such that the forward edges of the labels are supported upon the short shelf 22, while the rear ends of the label are supported upon the shelf 23.

Upon the frame 9 are mounted the journals 24ª, 25ª, 26ª, and 27ª for the rollers 24, 25, 26, and 27, and straps 28 (preferably having a rubber or other semi-adhesive covering over the part which comes in contact with the label, except a small portion at the rear end of the label in order that the adhesive material may not come in contact with the second label during the forward travel of the strap) are attached to roller 27 and pass over rollers 26, 25, and 24, one strap at each side of the hopper, and the straps have their ends attached to the cross-piece 29, to which is attached one end of rod 30, the other end of which is attached to the separator-bar 31, which extends across the machine, and the ends of which are adapted to travel in the slots 32 in the side frames 1 and 2. The roller 27 is also attached to strap 33, which after passing around the circumference of roller 27 is attached to the crank-arm 34 on the right-hand main shaft 11.

The hopper 35 for feeding the folded patterns comprises the four corner-supports 36 36, &c., and the bottom strips 37, carried by the frame 9. The rollers 38, 39, and 40 are mounted upon journals 38ª, 39ª, and 40ª, mounted in the cross-frame 9, and the strap 41 has one end attached to roller 40. After passing over rollers 39 and 38 the strap 41 is attached to the cross-bar 41ª, to which is attached one end of the rod 42, rod 42 being attached to the separator-bar 31. Straps 41 are located at each side of the hopper and between rollers 38 and 39 are on the level with the bottom strips 37 of the hopper. Strap 43 is attached to roller 40 and after passing around the periphery of roller 40 is attached to the crank-arm 44 on the end of the left-hand main shaft 10. The lower ends of the corner-pieces 36 are cut off at the proper distances to form the slots 45 and 46 at the front and rear ends of the hopper, the forward slot being sufficiently wide to permit a folded pattern to pass through the same and sufficiently narrow to prevent two or more patterns from passing through at the same time. A projection 47 is fixed to frame 9 between the straps 41 and prevents the patterns from being moved out of the rear of the hopper through the slot 46, and projections 48, having their rear sides beveled, are carried by the respective straps 41 41 and are adapted to move through the slot when the straps are moved.

In the periphery of the roller 40 is cut a groove 49, in which type for printing numbers on the patterns may be mounted, and 50 is an ink-roller, ordinarily made of suitable absorbent material, which roller is adapted to engage and ink the type when the roller 40 is turned by the turning of shaft 10. 51 51 are elastic fingers attached to the frame 9 and adapted to support the pattern as it is moved from the hopper 35.

In order to insure that the patterns and labels will be moved just the proper distance to register with each other, I provide projections 52 upon roller 40 and projections 53 upon roller 27, these projections being so arranged that when the rollers 40 and 27 are at the end of their movement, as hereinafter described, the projections 53 on roller 27 will act as a stop against further movement of the pattern, and in like manner the projections 52 upon roller 40 will act as a stop to prevent further movement of the label.

A compressor-yoke 54 is mounted at the top of the machine upon the vertical compressor plunger-rods 55 and 56, which extend downward through the frame 9 and are adapted to be raised and lowered therein, the lower ends of the plunger-rods being attached to a frame 57, which is provided with the bearings 58 58 for the compressor cam-shaft 59, which latter shaft also has suitable bearings in the side frames 1 and 2. The bearings 58 are formed so as to be movable vertically with respect to the frame 57. A roller 60 is fixed to a spindle 61, which has bearings 62 in the frame 57, and a cam 63 is fixed to the shaft 59 and is adapted to engage the roller 60, whereby turning of shaft 59 causes cam 63 to act upon roller 60 to raise and lower the frame 57, which carries the plunger-rods 55 and 56. Upon the compressor cam-shaft 59 is mounted the gear-wheel 64, which meshes with the gear-wheel 65, journaled in the frame 1 and meshing with a pinion 66, mounted upon the driving-shaft 5. The yoke 54 is provided at its respective ends with the arms 67 and 68, which project over the straps 41 and 28, respectively. Upon the arm 67 is carried a spring-pressed roller 69, which is adapted to engage the pattern when the yoke 54 is lowered and press the pattern against the type on roller 40. The compression of roller 69 also increases the friction between pattern and the roller 40 and facilitates the proper feeding of the pattern. A similar spring-pressed roller 70 is mounted upon the arm 68 to engage the labels. Upon arm 68 is also mounted the paste-pot 71, having the pasting-roller 72, which is so adjusted that when the yoke 54 is lowered the paste-roller does not ordinarily touch the label. The label is prevented from adhering to the roller by the guards 73. In order to apply the paste to the label, the spring-pressed bell-crank lever 75, having the paste-fingers 76, is employed, the lever 75 having a curved end adapted to engage the notches 77 cut in the roller 27 when the roller has reciprocated the proper distance. The lever 75 normally tends to hold fingers 76 in engagement with the paste-roller.

The action of the periphery of roller 27 forces the fingers away from the paste-roller, except when the curved end of lever 75 enters the notch 77, and then the spring forces the fingers against the paste-roller.

In the machine shown in the drawings the mechanism is arranged to bind the pattern and label upon two opposite edges, and therefore the securing mechanisms operated by the respective main shafts 10 and 11 are identical. I will herein describe the mechanism operated by the shaft 10, it being understood that the mechanism operated by the shaft 11 is the same.

Figures 9, 10, 11, 12, 13:
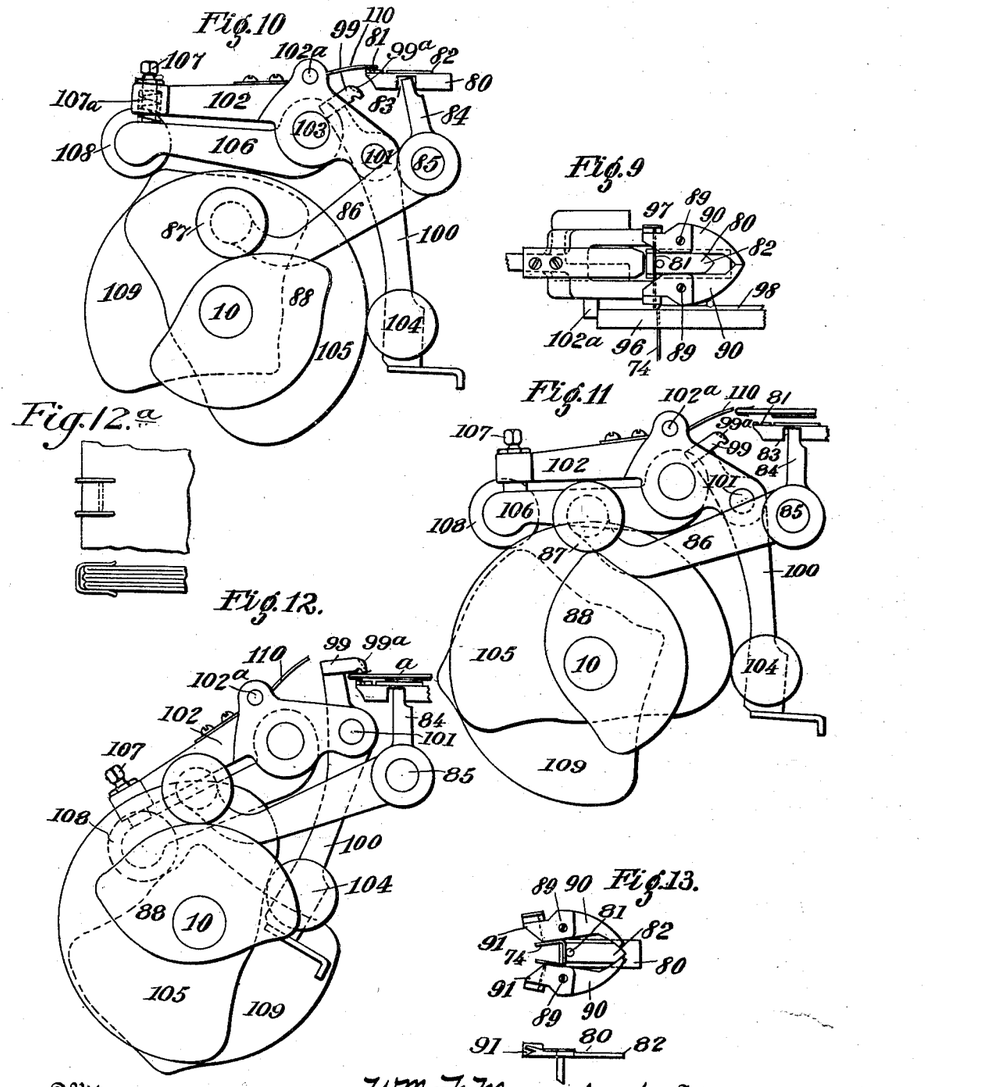
Fig. 9 is a detail top view of the wire cutter and former.
Figs. 10, 11, and 12 are detail views showing different positions of the cams and binder-former.
Fig. 13 is a detail view of the former-jaws.
Figures 14, 15, 16:
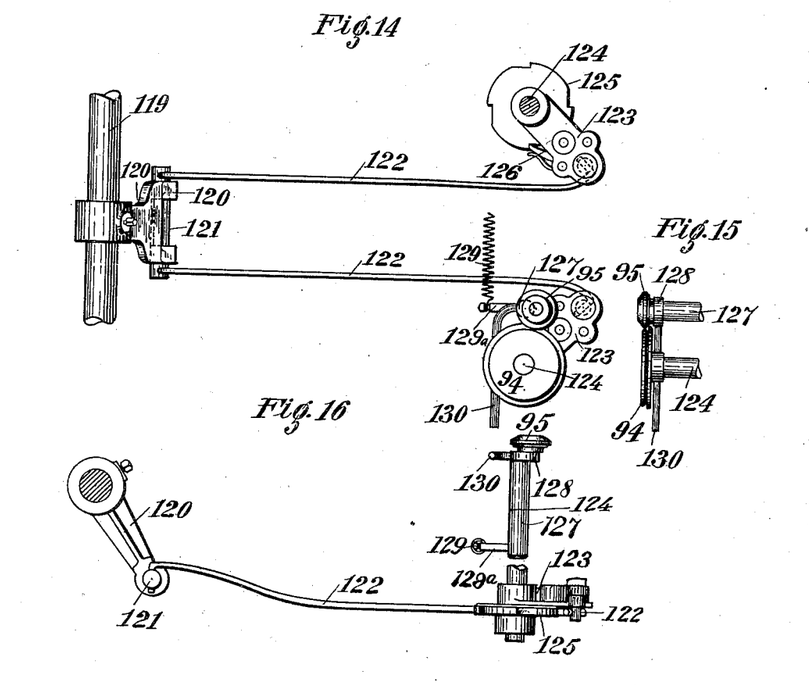
Fig. 14 is a detail top view of the wire-feeding mechanism.
Fig. 15 is a detail side view of the wire-feed rolls.
Fig. 16 is a detail side view of the wire-feeder mechanism.

In a slot in the bridge-piece $9^a$ slide the two binder former-blocks 80 and $80^a$, each of which is normally thrust outward from the center by the springs 79. The former-blocks, which are shown in detail in Figs. 9, 10, 11, and 12, are each provided with a transverse groove 81 in its upper face and a pointed rear end 82. A recess 83 is cut in the lower end of the block and is engaged by the finger 84, which is mounted upon shaft 85, which shaft has its bearings in the cross-frame 9 and bridge-piece $9^a$. The former-arm 86 is fixed to the shaft 85, and at its end carries a roller 87, which engages and is operated by the face of the cam 88, fixed to the main shaft 10. Upon each side of the former-block is pivoted at 89 a former-jaw 90, normally assuming the position shown in Fig. 9, but adapted to be moved by the pointed end 82 of the former-block 80 into the position shown in Fig. 13. Each of the former-jaws is provided with a slotted end 91, adapted to receive the wire. The wire-spool 92 is mounted upon a suitable part of the frame, and by means of suitable guides, such as 93, the wire 74 is guided between the rolls 94 and 95, to be hereinafter described, to and through a suitable guide-hole in the cutter-bar 96, thence by the jaw 91, passing through slot 81, until its end strikes a suitable stop 97. A knife 98 is fixed to the frame and engages the side of the cutter-bar 96, as shown in Fig. 9. The clencher-jaw 99 is mounted upon an arm 100, which is pivoted at 101 in the arm 102, the latter being pivoted upon a suitable stud 103, carried by the frame of the machine. A roller 104 is carried by the lower end of the clencher-arm 100 and engages and is operated by the cam 105, mounted upon the main shaft 10. An arm 106 is also pivoted to stud 103, and by means of a screw-threaded bolt 107 (and interposed spring $107^a$) is adjustably fixed to the arm 102, and arm 106 carries roll 108, which engages and is operated by the face of the cam 109, which is mounted upon shaft 10. Arm 102 also carries the projecting plate 110, which when the parts are in the position shown in Fig. 10 projects over the slot 81, and thus closes the upper side of the same. Upon arm 102 is also mounted the projection $102^a$, which when the arm moves sufficiently forward strikes against the end of the cutter-bar 96 and moves the same forward. The cutter-bar is normally pressed outward by the spring $96^a$. Springs 111 and $111^a$, attached, respectively, to the end of arm 100 and to plate 112, which is attached to arm 106, normally hold the rollers 104 and 108 in engagement with the face of the cams 105 and 109, the other ends of the springs being attached to the side frame of the machine.

A traveler-shaft 113 is mounted in the frames 1 and 2 and projects beyond the same. At one side of the frame the arm 114 is fixed to the end of shaft 113, and the link 115 connects the arm 114 with the gear-wheel 64. At the other side of the frame the arm 116 is fixed to the end of shaft 113, and a link 117 pivotally connects the end of arm 116 to the arm 118, which is carried by the end of the packer-shaft 119, the latter shaft having suitable bearings in the side frames 1 and 2. The packer-shaft 119 carries an arm 120, in the end of which is loosely mounted a pin 121, to each end of which is connected a rod 122, which extends forward to and is pivotally connected with the end of the arm 123, which arm is pivoted upon the vertical shaft 124. Shaft 124 has its bearings in the frame $9^a$ and carries at its upper end the grooved guide-wheel 94. Shaft 124 at its lower end carries the ratchet-wheel 125, the teeth of which are adapted to be engaged by the spring-pressed pawl 126, carried by the arm 123. In the upper part of the frame is also mounted the spindle 127, upon the upper end of which is an eccentric portion 128. Upon the eccentric portion 128 at one side of the spindle 127 is pivoted the wheel 95. To the spindle 127 is also fixed the lever $129^a$, to which is attached the spring 129, which at its other end is attached to the frame and tends to hold the wheel 95 against the wheel 94.

The wire from which the binder is to be formed is passed from the spool 92 between wheels 94 and 95 and thence through the opening in the cutter-bar 96 to the binder-forming mechanism. Step-by-step movement of wheels 94 and 95 therefore feeds the wire to the binder-forming mechanism as required, and the oscillation of the packer-shaft 119 will, through the ratchet-arm 123, cause the step-by-step movement of wheels 94 and 95.

In order that the machine may be operated without feeding the wire to the binder-forming mechanism, I provide the lever 130, attached to the spindle 127 and adapted to swing the wheel 95 out of engagement with the wheel 94 against the pressure of spring 129. When the wheels are so separated, the rotation of shaft 124 and wheel 94 will of course not cause any forward movement of the wire.

Figure 3:
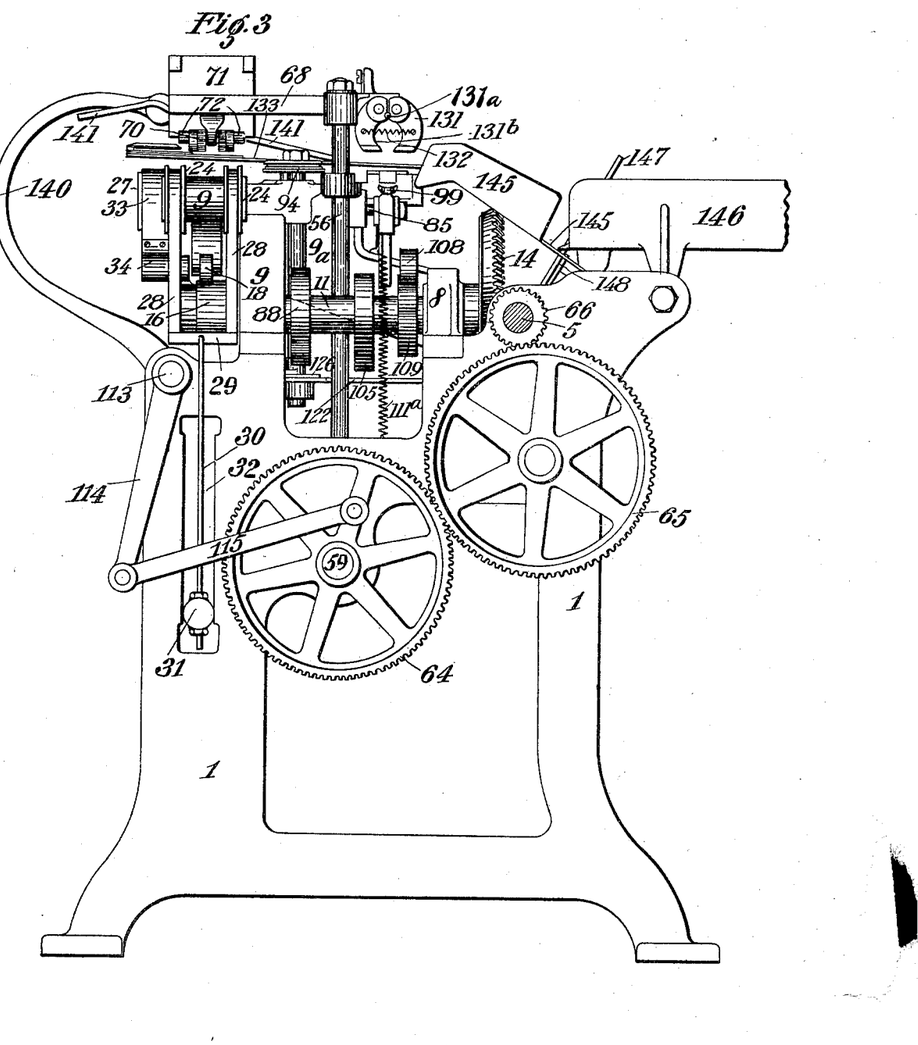
Fig. 3 is a side view of the machine, taken from the right-hand side of Fig. 1.
Figure 4:
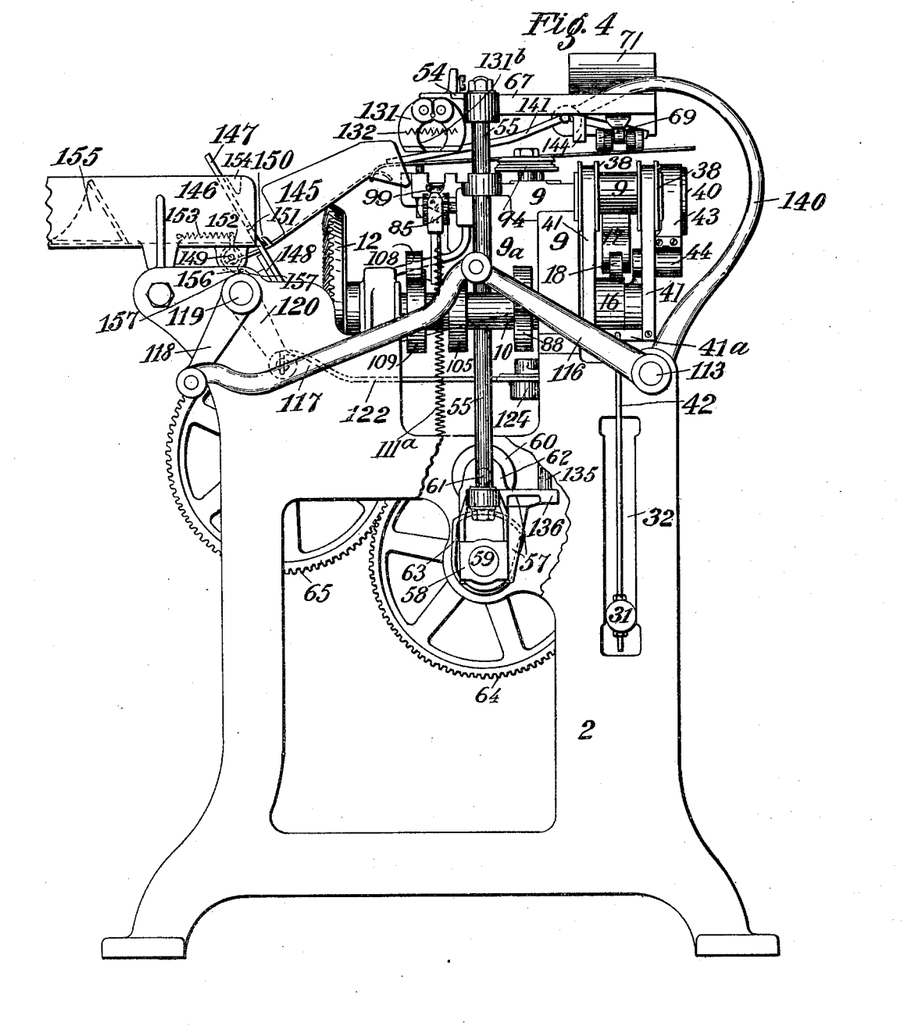
Fig. 4 is a side view taken from the left-hand side of Fig. 1.

Upon the opposite sides of the yoke 54 are carried the pairs of presser-feet 131, which are pivoted to the yoke and by means of a spring 132 are held together in the position shown in Figs. 3 and 4, and a stop-pin $131^a$, carried by the yoke, prevents the feet from swinging too far in or out. This mechanism, which is raised and lowered with the compressor-yoke, operates when lowered to clamp the pattern during the operation of the securing means, as hereinafter described.

The feed-plate 133 extends over the top of the machine between the hoppers and is pivoted by a pin 134 to the upright rods 135 135, which are attached to the projection 136 upon the frame 57, the rods 135 being suitably guided through the cross-frame 9. The feed-plate 133 is also retained in its proper position by the pin 137, which is loosely mounted in the bed-plate 78 of the staple-forming mechanism. The feed-plate at the part adjacent to the hoppers is provided with the guide-plates 138 and 139, which are substantially equal in width to the width of a pattern and are parallel to the plate 133, thus forming two parallel superimposed spaces or slots for the reception of the pattern and label, respectively. When the frame 57 is in its lowermost position, the feed-plate is dropped to such position that the patterns will be fed into the upper space and the labels into the lower space. A traveler 140 is carried by the rock-shaft 113 and carries the frame 141, which is pivoted to the end of the traveler 140 at 142. The frame 141 comprises two projecting arms, each of which has a nose 143, adapted to engage the patterns and labels bound together and push them off the end of the feed-plate 133, and also has the hooks 144, one at each side of the feed-plate, which hooks when the feed-plate 133 is raised to its uppermost position are adapted to hook under the pattern and label at the opposite edges of the feed-plate and push the pattern and label down to the position which said pattern and label are to occupy while being bound together. When the pattern and label are pushed forward by the hooks 144 beyond the plates 138 and 139, the label drops upon the top of the pattern, and the pattern and label registering edge to edge with each other rest upon plate 133. When the arm 140 is moved backward and again moved forward, as will be hereinafter described, during the forward movement the weight of the frame 141 causes the projections 143 to push the pattern and label from the securing mechanism to the chute 145.

145 represents guide-plates forming an inclined chute leading from the end of the feed-plate 133 to the hopper 146, which is supported on the tie-rod 4. A packer-plate 147 is carried upon the arm 148, which is mounted upon the packer-shaft 119, and thus the packer-plate 147 rocks between the bottom of the chute 145 and the end of the trough 146. At the end of the trough and journaled in suitable bearings carried by the trough is a suitable rocker-shaft 149, to which is attached the hook 150, which projects through a suitable opening 151 in the packer-plate 147. In the end of the rock-shaft 149 is fixed a pin 152, to which is attached a spring 153, the end of which is attached to the feed-trough 146, the tension of spring 153 holding the hook 150 normally against the end of the feed-trough and preventing the patterns in the trough from slipping out. The beveled projections 154 at the top of the trough prevent the upper ends of the patterns from falling over. A suitable weight 155 slides in the trough 146 and tends to compress the patterns in the trough. Upon the rock-shaft 149 is also mounted a cam 156, which is adapted to be engaged by the cam 157, carried by the packer-shaft 119, and the cams 156 and 157 being so adjusted that at the time the packer-plate is placing a pattern in the feed-trough the two cams will engage each other and the shaft 149 be moved against the tension of spring 153, and thus move the hook 150 out of the way to permit the introduction of the pattern. As the packer-plate 147 moves against the trough the cams snap past each other and are disengaged and the hook 150 is returned to the end of the trough.

In describing the operation of the machine I will first describe the operation of the separate groups of mechanism and then the operation of these groups with respect to each other.

Figure 1:
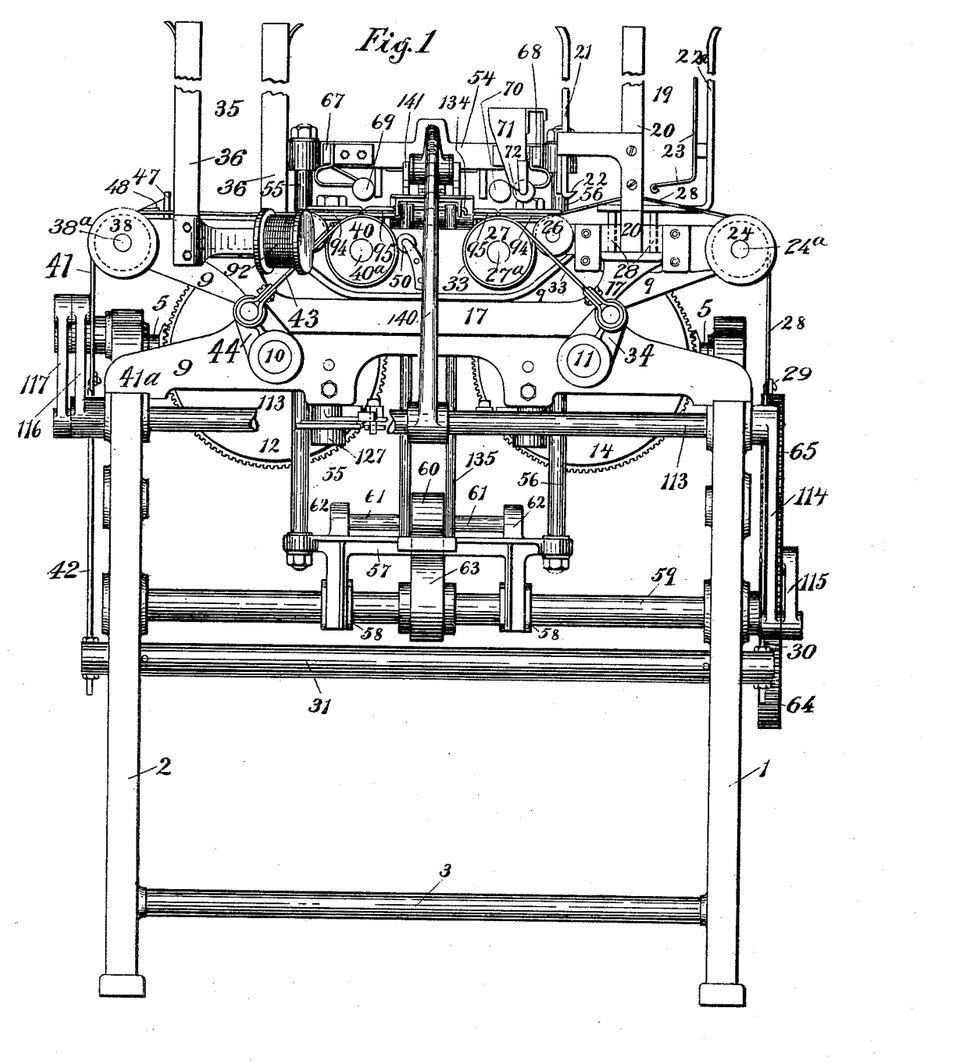
Figure 1 is a front view of a machine embodying the invention.
Figure 2:
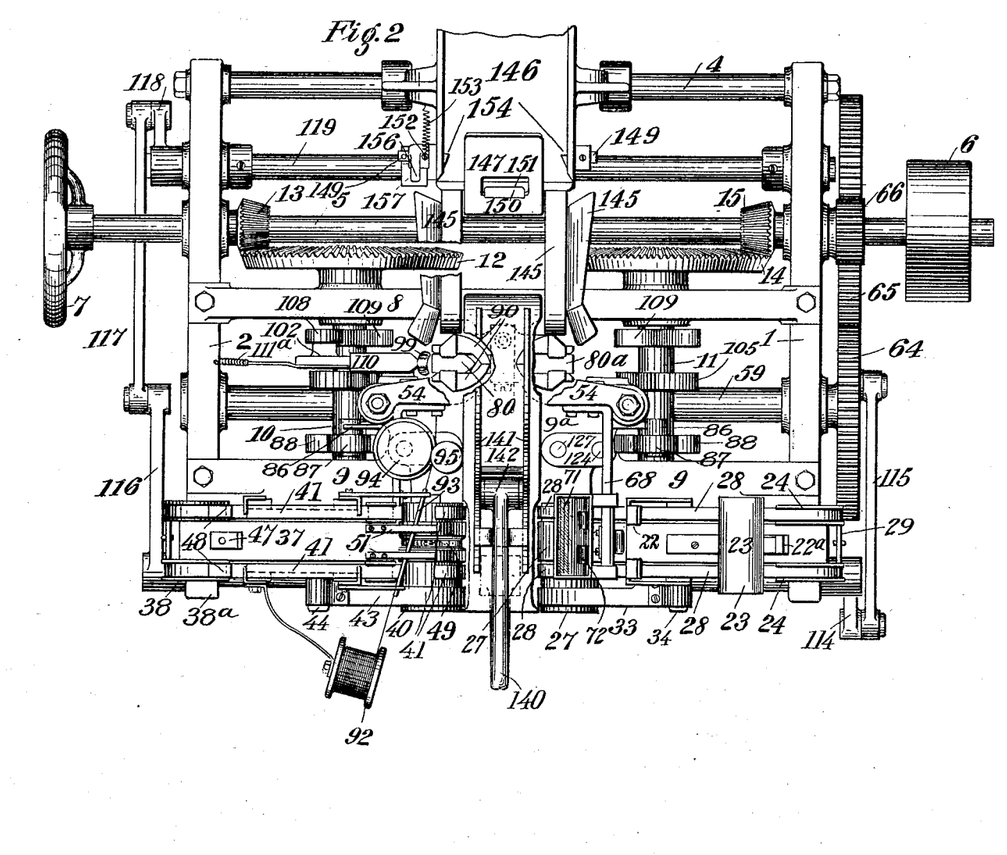
Fig. 2 is a top view of the same with parts broken away.

The operation of the label-separating mechanism is substantially as follows: The labels are placed in the hopper 19, their front edges resting upon the shelf 22 and their rear edges upon the shelf 23. Shelf 23 being higher than shelf 22, the labels will each be at an incline to the perpendicular hopper, and the front edge of each sheet will project slightly forward beyond the sheet above. This feature is not essential, but permits of a compact and convenient arrangement of the parts of the machine. At the time the parts are in the position shown in Fig. 5 the cams 15 and 16 have allowed the separator-frame 17 to drop to its lowermost position, and this brings the hopper 19 down to its lowermost position, as shown, at which time the bottom of the pile of labels intermediate the shelves 22 and 23 will rest at each side upon straps 28 28. In this position the shaft 11 is revolving from left to right. This pulls upon the strap 33, rotates roller 27 from left to right, thus drawing straps 28 against the weight of the separator-bar 31 over the rollers 26, 25, and 24 from right to left. The weight of the pile of labels causes the bottom label to adhere to the straps, and this friction is sufficient to carry forward the bottom label, which has previously been drawn off of the shoulder 22, as will be hereinafter described. To facilitate the forward movement of the label and insure that it should pass under shoulder 22, the shoulder may be beveled on its under side, as shown in Fig. 1. Further rotation of the main shaft 11 causes straps 28 to carry the label forward until it passes under the roller 70, Fig. 1, which descends to press the label against the roller 27. The descension of roller 70 is caused by the fact that said roller is carried by the bar 68 on the yoke 54, and the yoke 54 will have descended by reason of the action between its roller 60 and the cam 63 upon the compressor cam-shaft 59. About the time the roller 70 engages the label the cams 15 and 16 will become operative upon the separator-frame 17 and raise the same, thus raising the hopper 19 and its pile of labels out of engagement with the straps 28. The hopper remains in this position during the continued rotation of shaft 11 until the straps 28 have nearly completed their backward movement, when it descends and the forward portion of the bottom label engages straps 28. The friction of the straps moves the bottom label sufficiently to disengage its front edge from the shelf 22, as shown in Fig. 5, ready to be moved by the next forward movement of the straps in the manner before described. The friction between the revolving rollers 70 and 27 feeds the label forward, the label passing between the bottom of the feed-plate 133 and the guide-plate 138 until the rear edge passes from between the rollers, when the projections 53 on roller 27 push the label until the forward edge of the label meets the projections 52 upon the drum 40, which drum in the meantime has been so rotating that these projections are in the proper position to meet the edge of the label. The rotation of shaft 59 causes cam 63 to raise the yoke 57 and lift roller 70 out of contact with roller 27 when the label has passed thereunder.

The operation of the pattern-separating mechanism is as follows: The folded patterns are piled in the hopper 35 and rest upon the straps 41. The size of the slot 45 will have been adjusted by the adjustable plate 45ᵃ until the slot is of the proper width to permit one pattern to pass through at a time. When the parts are in the position shown in Fig. 5, the shaft 10 is revolving from right to left and crank 44 is drawing upon the strap 43, thus drawing the strap 41 against the weight of the separator-bar 31 over the rollers 38 and 39 from left to right and rotating roller 40 from right to left. As the roller 40 revolves the pattern is engaged by the projections 48 on the straps 41 and fed forward until the straps reach the limit of their forward motion. At this time the cam 63 lowers yoke 54, so that roller 69, carried by the bar 67, presses the pattern upon the roller 40, whereby the rotation of the roller 40 feeds the pattern forward (during which time it is printed, as hereinafter described) until the projections 52 on roller 40 engage the rear end of the pattern and feed it into the space between the plates 138 and 139 upon the guide-plate 133. While the projections 52 are thus pushing the pattern forward the projections 53 upon the roller 27 will be advancing toward the pattern and at the proper time will meet the forward edge of the pattern and prevent its further advancement, thus securing an accurate register of the pattern and label. During the backward movement of the straps 41 the projections 48 upon the straps pass out of the hopper 35 through the slots 46. This will not move any of the patterns out of the hopper, because the stop 47 between the straps 37 would prevent such movement, and the beveled rear sides of the projections 48 also prevent the straps from taking any hold upon the patterns. The backward movement of straps 41 is caused by the continued rotation of the main shaft 10, which is also accompanied by movement of the cam-shaft 59, causing cam 63 to raise yoke 54, and thus lift roller 69 away from drum 40.

The operation of the printing mechanism is substantially as follows: The type are placed in the slot 49 of the roller 40, and while the pattern is being fed forward, as before described, and is held in engagement with the roller 40 by the roller 69 the type will make an impression upon the pattern. As the roller further revolves from left to right the type engage the inking-roller 50 and are inked for a fresh impression. When the roller 40 reverses its movement, the type are carried back into position to engage the next pattern.

The operation of the pasting mechanism is substantially as follows: The paste is contained in the paste-pot 71, which descends with the bar 68 at the same time that the roller 70 descends; but the paste-roller 72 does not descend far enough to engage the label. When the rotation of the roller 27 has moved the label the proper distance, the rounded end of the lever 75, engages the notch 77 in the roller 27, and the lever being suitably spring-pressed the paste-fingers 76 rise beneath the label and raise the label until it touches the paste-roller 72, thus placing a determined number of paste pats on the label. The label is prevented from adhering to the paste-roller 72 by the guards 73. As the roller 27 further rotates its periphery forces lever 75 outward and depresses the paste-fingers 76. The pattern and the paste-carrying label are afterward pressed together by the presser-feet 131, as will be hereinafter described.

The operation of the mechanism for securing the folds of the pattern is substantially as follows: The pattern and the label together after having been suitably carried along the guide-plate 133 by the hooks 144 rest upon said plate at a point immediately over the securing mechanism, the edges of the pattern and label projecting beyond the side edges of the plate 133 and being substantially even with the ends of the former-jaws 90. While this carrying of the patterns and label has been going on the backward rocking of shaft 119 and arm 120 pulls upon rod 122 and moving the ratchet-arms 123 and ratchet-wheel 125 turns the shaft 124, which rotates the guide-wheels 94 and 95, by which the wire from the spool 92 is unwound and moved forward a distance equal to the length of one staple, causing the end of the wire 74 after it has passed through the hole in the cutter-bar 96 to extend between the slotted ends of the jaws 91 and through slot 81 in block 80 until its end strikes the stop 97. In this position the parts are as shown in detail in Figs. 9 and 10. As the main shaft 10 now rotates from right to left the face of cam 109 operates against roller 108, which raises arm 102, causing stop 102ª to move the cutter-bar 96 to cut the wire 74. Immediately afterward the cam 88 becomes operative upon the roller 87 upon former-arm 86 and turns the shaft 85 and causes the finger 84 to slide the block 80 inward. The wire being cut by the movement of arm 102, the wire rests in the slot 81, and as the block 80 moves inward its middle is drawn inward with the block 80, the ends of the wire being bent by the ends of the jaws 90 as the block is drawn back. At the extreme limit of the inward movement of block 80 the point 82 has engaged the inner ends of the jaws 90 and turned said jaws upon the pivots 89, thus bending the ends of the binder inward toward each other, as shown in detail in Fig. 13. In this position the parts are shown in detail in Fig. 11. Further rotation of shaft 10 and the cam 88 now allows the finger 84 and block 80 to move outward, carrying the binder, which rests on the end of the block, and the cams 105 and 109 becoming operative upon the rollers 104 and 108, respectively, further cause the clencher-head 99 to move upward around the outer end of the block 80, over, and then down upon the top of the same to the position shown in detail in Fig. 12. While the clencher-head is making this movement the ends of the bent wire or binder are caught and guided by the grooves 99ª 99ª in the top of the clencher-head, and the binder being held in position by the presser-feet, as hereinafter described, the clencher-head bends the two ends of the binder upward and then down upon the edge of the pattern. Before the clencher-head has made this movement the yoke 54 has descended and the presser-feet 131 have been brought down upon the pattern, clamping the same to the bed-plate of the securing mechanism, the inner corners of the lower end of the feet resting immediately over the ends of the jaws 90, so that the middle portion of the binder and a small portion of the ends of the binder are held by the presser-feet. The clencher-head after bending the ends of the binder upward in descending meets the inclined surfaces 131ᵇ of the inner corners of the presser-feet and spreads the same apart, thus permitting the clenching of the binder upon the pattern by the clencher-head. Continued movement of the shaft 10 causes the cams 105 and 109 to raise the clencher-head and swing it upward around and under the block 80 to the position shown in Fig. 10. At the same time cam 63 will raise the yoke 54, which raises the presser-feet away from the binder and pattern, and as the presser-feet rise the spring 137 raises the guide-plate 133, thus raising the pattern and label with binder attached away from the securing mechanism. It will be understood, of course, that the operation of the securing mechanism on the other side of the machine is the same as that above described. By means of the screw-bolt 107 and spring 107ª the arms 102 and 106 may be adjusted with respect to each other, thus adjusting the height to which the clencher-head may travel, the spring 107ª allowing the clencher-head to be self-adjusting to a certain extent, thus not only clenching the binder firmly on various thicknesses of material, but serving also to prevent possible breakages of the parts.

Figure 6:
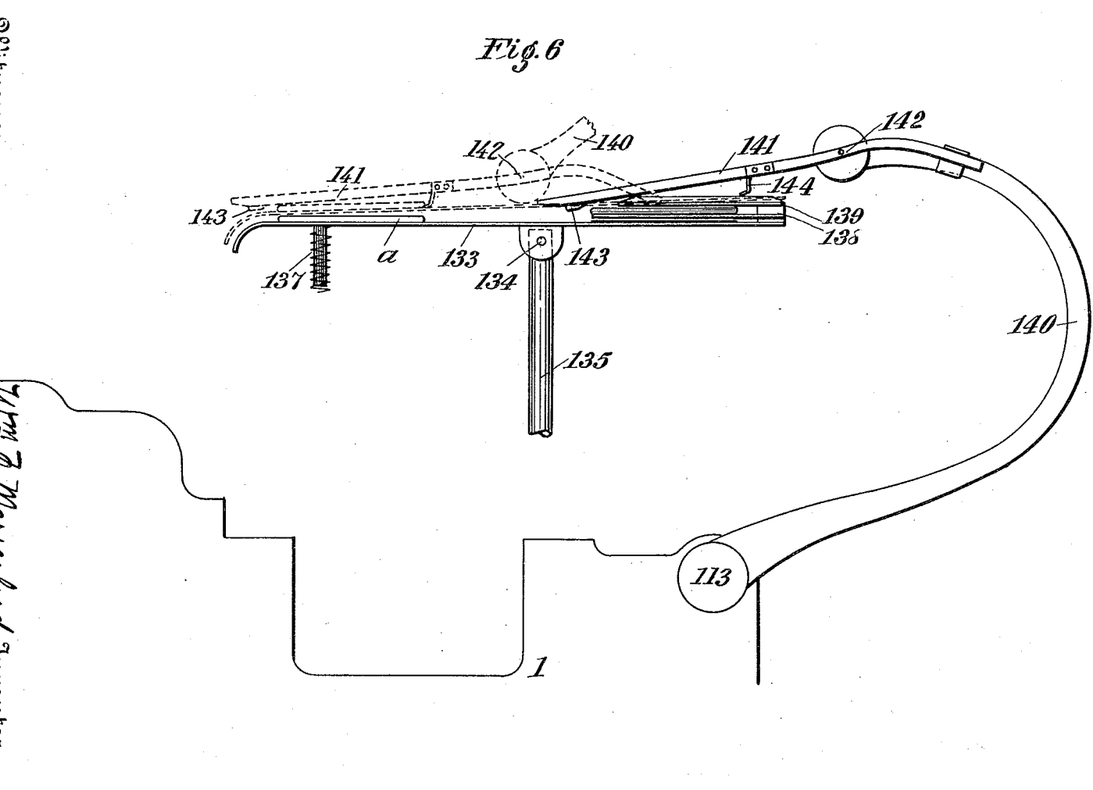
Fig. 6 is a detail side view of the traveler.
Figure 7:
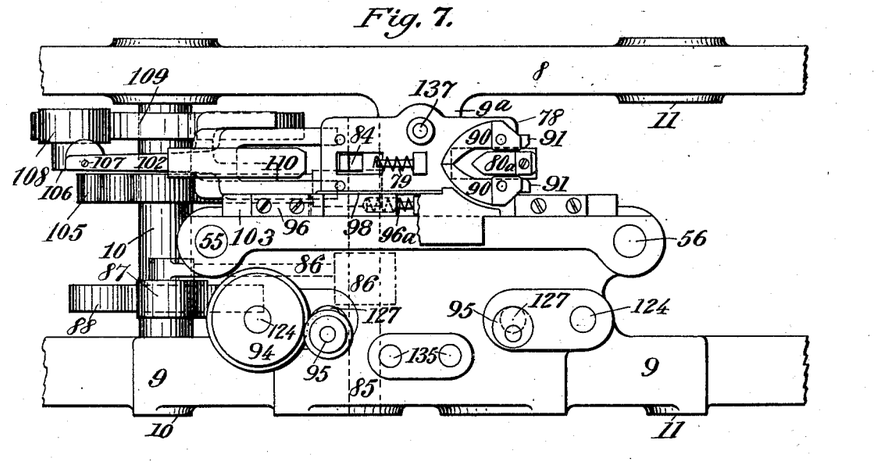
Fig. 7 is a detail top view of the securing mechanism.
Figure 8:
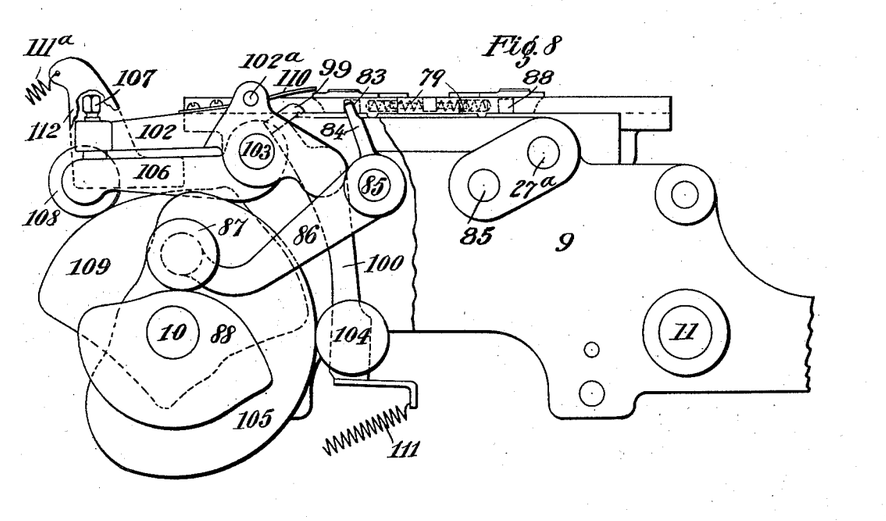
Fig. 8 is a side view of the same.

The operation of the feeding and packing mechanism is substantially as follows: At the time the label and pattern have been fed in between the plates 133, 138, and 139 the cam 63 has lowered the frame 57 so that the rods 135 have lowered the feed-plate 133, the parts then being in the position shown in detail in Fig. 6. Next the rotation of the cam-shaft 59 raises frame 57 and rods 135, thus raising the guide-plate 133 between the hooks 144 until the latter on each side of the guide-plate stand below the plate and in position to engage the pattern and label. The rotation of gear-wheel 64 now causes the traveler-shaft 113 to move the traveler 140 forward. As the traveler moves forward the hooks 144 push the pattern and label together along the guide-plate 133 until they reach the position occupied by the pattern and label $a$ in Fig. 6, which is in position to be operated upon by the securing mechanism. During the forward movement of arms 141 the projections 143 upon the ends of the arms will engage the pattern and label $a$ and push the same forward into the chute 145. Further movement of the parts causes the traveler 140 to move backward and the guide-plate 133 to drop into position to receive the next pattern and label. At the time the pattern and label $a$ are pushed into the chute 145 the arms 116 and 117 will have moved the arm 118 to rotate shaft 119 until the packer-plate 147 will be beneath the chute 145. The pattern thus drops upon the plate 147. While the packer-plate is being so moved the retaining-hook 150 will be against the end of the trough 146 to prevent the patterns from getting out of the trough. The shaft 119 will now rock back to the position shown in Fig. 4, carrying with it the stapled pattern and placing the same in the trough. As the plate 147 moves toward the trough the cams 156 and 157 engage and snap past each other and rotate shaft 149 to to move hook 150 away from the end of the trough, permitting the packer-plate to place the pattern in the end of the trough, the spring 153 immediately thereafter snapping hook 150 into place to hold the pattern in the trough.

The general operation of the machine is substantially as follows: The patterns and labels having been placed in their respective hoppers, power is applied to the pulley 6, which rotates shaft 5. Shaft 5 being rotated rotates the main shafts 10 and 11 in opposite directions. The rotation of the main shafts causes the operation of the cams 88, 105, and 109, which operate the securing mechanism, as before described, and also causes the rotation of the cams 15 16, which raise and lower the separator-frame 17, carrying the label-hopper. The rotation of shafts 10 and 11 also rotates cranks 34 and 44, which operate the rollers 27 and 40, these rollers controlling the movement of the inking-roller and the separator-straps 28 and 41. The shaft 5 carries the pinion 66, which rotates gear-wheels 65 and 64. The rotation of gear-wheel 64 by the arms 114 and 115 rocks the traveler-shaft 113, which operates the traveler-arm 140 and also operates the arms 116 and 117, which operate the packer-shaft 119. The packer-shaft 119 operates the wire-feeding mechanism through the arm 120 and rods 122 and also operates the packer-plate 147 and the retainer-hook 150. The movement of gear-wheel 64 also moves the cam-shaft 59, upon which it is mounted, this cam-shaft controlling the raising and lowering of the yoke 54 and the guide-plate 133.

It will be seen that the various operations performed by the machine may be performed in varying sequence without departing from the invention. For illustration, the folds of the pattern may be secured and then the label attached, or the various operations arranged in various other sequences. Some of the operations may be dispensed with. Instead of securing the folds at both sides one side only may be secured, or, indeed, the entire binder-forming mechanism may be dispensed with and paste applied to one or both ends of the label and the clencher heads and arms be permitted to simply turn over the pasted end of the label and press it down upon the folded pattern, substantially as the wire is folded over and pressed down. The label may be pasted at one side and secured at another. In using the term "securing" in this specification and accompanying claims I intend to include all equivalent means of fastening the folds of the pattern together—such as by wire, paste, or otherwise and whether the paper be perforated by the wire or the wire be bent around the edges, as here shown. It is also to be understood that the various mechanisms employed herein may be dispensed with and suitable equivalents employed, or the mechanisms may be interchanged or varied in numerous ways, without departing from the invention, and I therefore desire it to be understood that I do not herein limit myself to the precise mechanisms shown, but intend to claim, broadly, all equivalent mechanisms for performing similar functions.

Having thus described my invention, I declare that what I claim as new, and desire to secure by Letters Patent, is—

1. The combination of means for delivering a pattern and a label to each other, means for causing the pattern and label to register edge to edge with each other, means for securing the folds of the pattern and the label together, and means for causing the successive operation of each of said above-named means, substantially as described.

2. The combination of separating means for separating a pattern and a label from respective supply-hoppers, means for delivering the pattern and the label to each other, means for causing the pattern and the label to register, means for attaching them together, means for securing the folds of the pattern, and means for causing the successive operation of each of said above-named means, substantially as described.

3. The combination of means for delivering a pattern and a label to each other, means for applying paste to the label, means for causing them to register, means for pressing them together, means for securing the folds of the pattern, and means for causing the successive operation of each of said above-named means, substantially as described.

4. The combination of means for separating a pattern and a label from respective supply-hoppers, means for delivering the label and pattern to each other, means for printing upon the pattern, means for pasting the label to the pattern, means for securing the folds of the pattern, and means for causing the successive operation of each of said above-named means, substantially as described.

5. The combination of separating means for separating a pattern and a label from respective supply-hoppers, means for delivering the same to each other, means for causing them to register, means for pasting the pattern and label to each other, securing means for fastening the folds of the pattern, and means for causing the successive operation of each of said above-named means, substantially as described.

6. The combination of separating means for separating a pattern and a label from respective supply-hoppers, securing means for fastening the folds of the pattern, means for pasting the label to the pattern, and means for causing the successive operation of each of said above-named means, substantially as described.

7. The combination of a securing means for fastening the folds of a pattern, means for delivering the pattern and a label to each other, means for attaching them together, and means for causing the successive operation of each of said above-named means, substantially as described.

8. The combination of a securing means for fastening the folds of a pattern, means for delivering the pattern and a label to each other, means for causing them to register, means for attaching them together, and means for causing the successive operation of each of said above-named means, substantially as described.

9. The combination of means for delivering a pattern and a label to each other, means for securing the folds of said pattern at the side thereof, means for attaching the label and the pattern together, and means for causing the successive operation of each of said above-named means, substantially as described.

10. The combination of means for delivering a pattern and a label to each other, means for securing the folds of the pattern at a side thereof, means for applying paste to the label, means for pressing the pattern and label together, and means for causing the successive operation of each of said above-named means, substantially as described.

11. The combination of means for delivering a pattern and a label to each other, of a paste-roller, means for raising a portion of the label into contact with the paste-roller on its way to the pattern, means for pressing the pattern and label together, means for securing the folds of the pattern, and means for causing the successive operation of each of said above-named means, substantially as described.

12. The combination of means for delivering a pattern and a label to each other, of a paste-roller, means for bringing the label in contact with the paste-roller on its way to the pattern, means for securing the folds of the pattern, and means for causing the successive operation of each of said above-named means, substantially as described.

13. The combination of a reciprocating carrier-strap, an open-ended hopper having a supporting-shelf for the hopper contents, means for moving said hopper so that its contents are intermittently brought into contact with the carrier-strap while moving in the direction to disengage the contents from the shelf and for maintaining the contact while moving in opposite direction to remove the disengaged contents, and means for operating said carrier-strap, substantially as described.

14. The combination of a reciprocating carrier-strap, an open-ended hopper having a supporting-shelf for the hopper contents and arranged to receive the said contents at an angle to the sides of the hopper, and means for intermittently moving the hopper to bring its contents into engagement with the strap while moving in the direction to disengage the contents from the shelf and for maintaining the contact to remove the disengaged contents, substantially as described.

15. The combination of a reciprocating strap, of an open-ended hopper having a forward shelf and a rear shelf transversely located with respect to said strap, the contents of said hopper being adapted to rest upon said shelves, and means for moving said hopper to bring its contents into engagement with the strap, substantially as described.

16. The combination of a reciprocating strap, of an open-ended hopper having a forward shelf and a rear shelf, the contents of said hopper being adapted to rest upon said shelves, and means for moving said hopper to bring its contents into engagement with the strap shortly before the strap has completed its rearward movement, and means for moving the hopper contents out of engagement with the strap when the lowermost sheet is removed from the hopper, substantially as described.

17. The combination of a hopper having an open-ended bottom and a shelf adapted to support one edge of a pile of sheets of paper when contained in said hopper, and means for moving the lowermost sheet in one direction to remove it from said shelf, and means for moving the sheet in the opposite direction to move it under said shelf and from the hopper, substantially as described.

18. The combination of a hopper having an open-ended bottom and a shelf for supporting one edge of the contained sheets of paper, a reciprocating strap or straps, and means for bringing the open-ended bottom in contact with the strap or straps while moving in one direction to disengage the lowermost sheet from said shelf and maintaining the contact when the strap moves in the opposite direction to remove the sheet from the hopper, substantially as described.

19. The combination of a hopper for patterns and a hopper for labels, means for separating the patterns and labels from their respective hoppers and for bringing them together, means for attaching the pattern and label together, and means for moving the pattern and label together to said attaching means, substantially as described.

20. The combination of a hopper for patterns and a hopper for labels, means for separating the patterns and labels from their respective hoppers and for bringing the separated pattern and label together, means for securing the folds of the pattern, means for attaching the pattern and label together, means for moving the pattern and label together to said securing and attaching means, and means for causing the successive operation of each of said above-named means, substantially as described.

21. The combination of means for delivering a pattern and a label to each other, means for causing the same to register, binder-forming mechanism and binder-clenching mechanism, means for delivering the pattern and label to said binder-clenching mechanism, and means for causing the successive operation of each of said above-named means, substantially as described.

22. The combination of means for delivering a pattern and a label to each other, means for causing the pattern and label to register, means for forming a binder at one side of said pattern and label, and means for clenching said binder around the edge of said pattern and label, substantially as described.

23. The combination of means for delivering a pattern and a label to each other, means for causing the same to register, a wire-feeding mechanism, mechanism for forming a binder of the wire from said wire-feeding mechanism, means for delivering the pattern and label to the binder-forming mechanism, a clencher-head adapted to bend the binder around the edge of the pattern and label, and means for operating said clencher-head, substantially as described.

24. The combination of means for delivering a pattern and a label to each other, means operative upon the edges of said pattern and label for causing the same to register edge to edge with each other, means for securing them together, and means for causing the successive operation of each of the above-named means, substantially as described.

25. The combination of means for delivering a pattern and a label to each other, means for causing the same to register, means for applying paste to said label, a guide-plate, means for delivering said pattern and label upon said guide-plate, a binder-forming mechanism, a clencher-head adapted to attach the binder to the pattern and label, means for operating said clencher-head, and means for causing the successive operation of each of the above-named means, substantially as described.

26. In a machine of the character described, the combination with a bed-plate, means for delivering a pattern thereto, means for clamping the pattern to the bed-plate, a clencher-head, mechanism for moving the clencher-head around the edge of said bed-plate and down upon the pattern, clencher-head-removing clamping means, substantially as described.

27. In a machine of the character described the combination with a bed-plate, of means for delivering a pattern thereto, means for clamping the pattern to the bed-plate, a clencher-head, and cam mechanism for moving said clencher-head around the edge of said bed-plate and down upon the pattern, the said clencher-head removing the said clamping means before contacting with the pattern, substantially as described.

28. In a machine of the character described the combination with a bed-plate, of means for delivering a pattern thereto, means for clamping the pattern to the bed-plate, a clencher-head, cam mechanism for moving the clencher-head around the edge of said plate and down upon the pattern, the said clencher-head removing the said clamping means before contacting with the pattern, and means for adjusting the height to which said clencher-head may travel, substantially as described.

29. In a machine of the character described the combination with a bed-plate, of means for delivering a pattern thereto, a clencher-arm carrying a clencher-head, a pivoted arm to which said clencher-arm is pivoted, and two cams operating respectively upon the ends of the clencher-arm and said second-mentioned arm, said cams acting to raise and lower said clencher-arm and to move said clencher-arm upon its pivot, substantially as described.

30. The combination of a chute, a trough, a packer-plate traveling between said chute and said trough and having an opening therein, a retainer-hook adapted to engage the end of the trough and itself projecting through said opening, and means whereby as the said packer-plate moves toward said trough the said hook will be momentarily snapped away from the end of the trough, substantially as described.

31. The combination of a chute, a trough, a packer-plate rocking between said chute and the end of said trough, a retainer-hook normally engaging the end of said trough, and means for disengaging said retainer-hook when the packer-plate rocks toward the end of the trough, substantially as described.

32. The combination of a chute, a trough, a packer-shaft carrying a packer-plate, means for rocking said shaft whereby said packer-plate is rocked between said chute and the end of the trough, a retainer-hook normally engaging the end of said trough, and a cam on said packer-shaft adapted to disengage said retainer-hook, substantially as described.

33. The combination of a slotted guide-plate, means for delivering a pattern and a label to the respective slots in said plate, a chute, and a traveler-arm adapted to move said pattern and label from said slots to said chute, substantially as described.

34. The combination of a slotted guide-plate, means for delivering a pattern and a label to the respective slots in said plate, presser mechanism, a chute, and a traveler-arm adapted to move said pattern and label from said slots to said presser mechanism and from said presser mechanism to said chute, substantially as described.

35. The combination of a slotted guide-plate, means for delivering a pattern and a label into the respective slots, means for causing them to register, presser mechanism, a chute, a traveler-arm adapted to move said pattern and label from said slots to said presser mechanism and from said presser mechanism to said chute and means for raising said guide-plate to bring the pattern and label into engagement with the traveler-arm, substantially as described.

36. The combination of a hopper open at the bottom and having a forward and a rear supporting-shelf adapted to support a pile of labels in said hopper, and means for first disengaging a label from one of said shelves, then from the other shelf, and then removing the label from the hopper, substantially as described.

37. The combination of a hopper open at the bottom and having a forward and a rear supporting-shelf adapted to support a pile of labels in said hopper, and a reciprocating strap or straps adapted to first disengage a label from one of said shelves, then from the other shelf, and then remove the label from the hopper, substantially as described.

38. The combination of a hopper for paper patterns, mechanism for successively separating patterns from said hopper, means for printing upon one face of said folded patterns, means for securing the folds of said patterns, and means for delivering said patterns from the separating means to the printing and securing means, substantially as described.

39. The combination of means for securing the folds of a pattern, means for delivering a folded pattern thereto, presser mechanism for clamping the pattern at said securing means, and means for operating said securing means, substantially as described.

40. The combination of a supply-hopper for folded paper patterns, a feed-plate, means for delivering patterns from said hopper to the feed-plate, means for moving said pattern along said feed-plate to a stapling mechanism, stapling mechanism and means for operating the same, substantially as described.

41. The combination of a supply-hopper for folded paper patterns, a stapling mechanism, wire-feeding mechanism therefor, a feed-plate leading to said stapling mechanism, and means for separating a pattern from said hopper, delivering it to said feed-plate and moving it along said feed-plate to said stapling mechanism, substantially as described.

42. The combination of a supply-hopper for folded paper patterns, a staple-forming mechanism, a wire-feeding mechanism therefor, means for separating a pattern from said hopper and delivering it to said stapling mechanism, a clencher-head adapted to attach a staple to said pattern, and means for operating said clencher-head, substantially as described.

In testimony whereof I affix my signature in presence of two witnesses.

WILLIAM F. MARRESFORD.

Witnesses:
   C. V. EDWARDS,
   RALPH JONAS.